Figure 4:
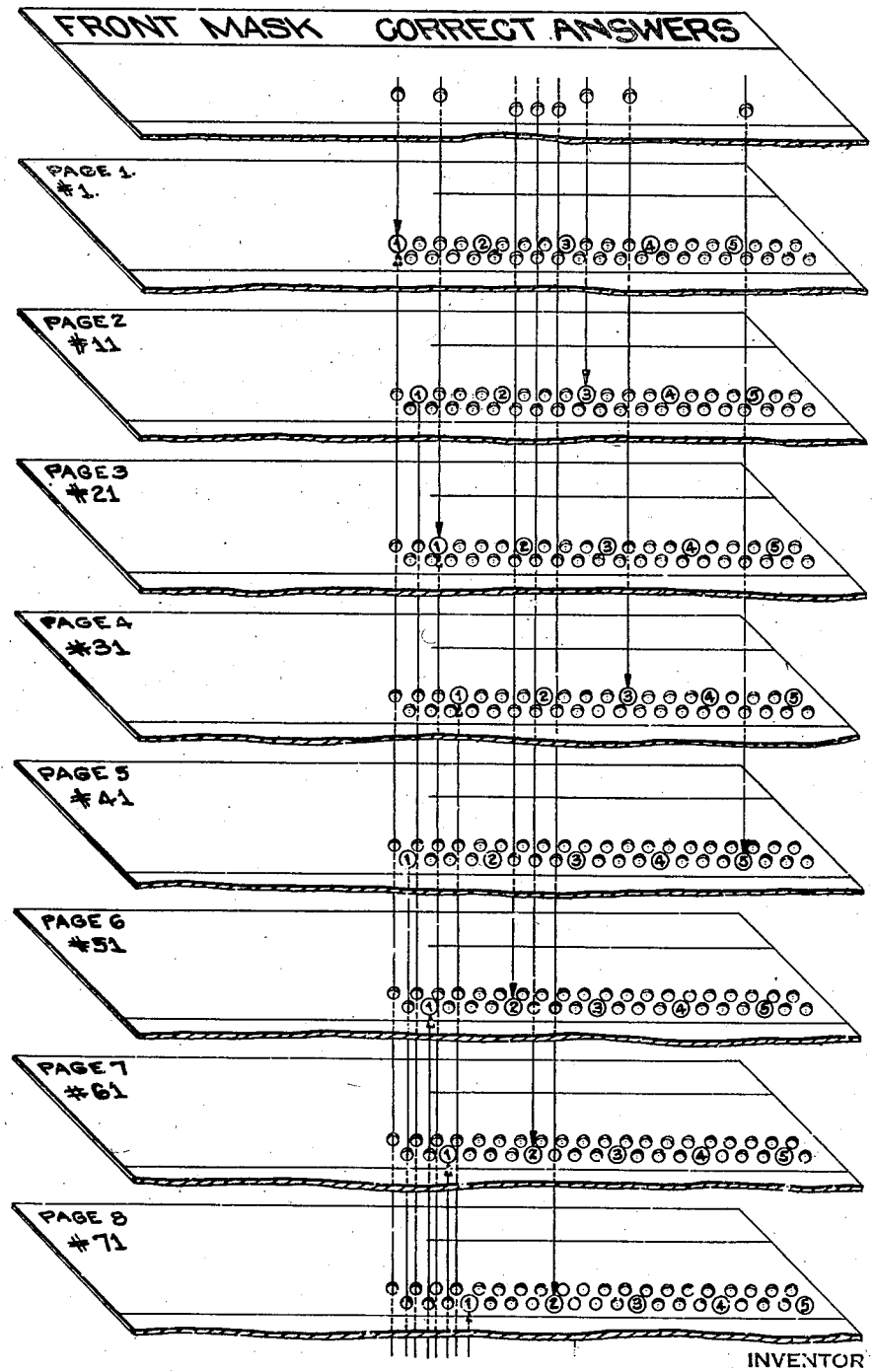

May 2, 1939.  T. E. TORKELSON  2,157,036
RECORD BOOK AND SCORING DEVICE
Filed Nov. 18, 1936  2 Sheets-Sheet 1
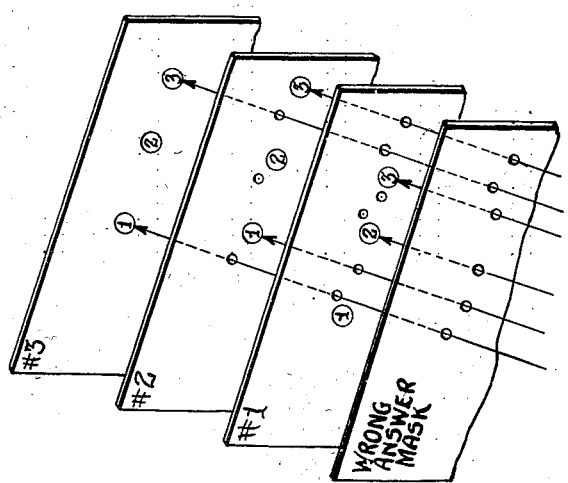
INVENTOR
BY Torkel Edwin Torkelson
N. M. Nilson
ATTORNEY May 2, 1939. T. E. TORKELSON 2,157,036
RECORD BOOK AND SCORING DEVICE
Filed Nov. 18, 1936   2 Sheets-Sheet 2

INVENTOR
BY Torkel Edwin Torkelson
W. M. Wilson
ATTORNEY

Patented May 2, 1939

2,157,036

UNITED STATES PATENT OFFICE 2,157,036

RECORD BOOK AND SCORING DEVICE

Torkel Edwin Torkelson, Baldwin, N. Y., assignor to International Business Machines Corporation, New York, N. Y., a corporation of New York Application November 18, 1936, Serial No. 111,338

2 Claims. (Cl. 35—48)

This case relates to a book of record or indicia-bearing sheets.

The object is to provide a book of record sheets arranged and constructed so that the indicia on all the sheets may be viewed or read without opening the book.

The object is, further, to provide a book of indicia-bearing sheets the indicia on all of which may be simultaneously viewed or read at one exposure.

The object is, still further, to provide a book of record sheets the indicia on which are exposed on and through the uppermost sheet.

The object, moreover, is to provide a book of record sheets, each sheet bearing indicia front and back, and all of the sheets of which may be scanned for front or back indicia without opening the book.

Another object is to provide a record sheet with indicia or intelligence bearing portions and indicia or intelligence exposing portions arranged to expose the indicia bearing portions on one or more sheets underneath the first sheet.

Another object is also to provide a book or stack of such record sheets in combination with a mask or master sheet for disclosing selected indicia points of the super-imposed sheets and concealing the other indicia points.

One particular application of the invention is in examination systems of the multi-choice or "yes" and "no" type. In these examinations, a great many questions are propounded which require a corresponding number of answers. An examination book with the questions is given to the student taking the examination. The book has a plurality of sheets, and a number of questions and spaces for answers are provided on each page of the book, preferably on opposite pages of each sheet or leaf of the book. The book of examination pages is conveniently handled by the student and after the examination, these books are collected to be marked. To mark or tabulate the answer of the examination book, the first page of the book is covered by a mask or master sheet which exposes only the indicia points assigned to one set of answers, either the right or wrong answers. The exposed indicia points may be scanned and counted manually.

Another application of the invention is in recording data, such as census data, in which items of different significance or value are to be denoted. A book of a plurality of superimposed leaves is given to the census taker. Each page of the book has provisions for selectively designating different facts with regard to different individuals. The book may be read, without being opened, to observe the facts denoted on all the pages of the book.

In the drawings:

Fig. 1 is a view of the front of the examination or quiz book,

Fig. 2 is a front view of the upper part of the mask or master sheet for exposing only the indicia points assigned to the correct answers, Fig. 3 is a front view of the upper part of a record book arranged to record data, such as census data, including items of different values, Fig. 4 shows diagrammatically the top corresponding fields of the sheets of the examination book separated to illustrate the scheme and construction of indicia bearing and exposing points of each of the sheets.

Fig. 5 shows diagrammatically three superposed sheets with a mask for exposing all the indicia points assigned to the possible wrong answers.

The examination book and marking system will be described first.

The examination book, as an example, has four sheets folded in folio and bound together at the top to provide eight leaves, the front pages or obverse sides of which are numbered 1 to 8, and the back pages or reverse sides of which are numbered 9 to 16.

Each page of the book has ten correspondingly located question fields. The similarly numbered question fields on all the pages are in superimposed relationship.

In the chosen example, each question field contains one printed question providing a choice of five answers, numbered 1 to 5, as indicated in field #1, bearing question 1 on page 1, shown in Fig. 1. Further, each question field has two horizontal rows of index points or spots. The index points of the several fields of each page are located in columnar alinement. Also, the index points of corresponding or superimposed fields of all the pages are in superimposed locations.

There are twenty points in each row of index points. All but five of these index points are in the form of perforations, which may be referred to as intelligence or indicia revealing or exposing points or spots. The remaining five index spots of each field are opaque, and in the form of circles numbered 1 to 5, as by placing one of these numbers in the area of each different spot. These numbered index spots of a field are the item, designation, indicia, or intelligence-bearing or answer points of the field. For convenience, although not essential, it is preferred to place the five indicia spots of each field equal distances apart along one of the rows of the field.

The student is instructed to place a black mark, such as an X, in the indicia spot bearing the number of the answer the student believes to be correct. Thus, as shown in Fig. 1, question #1 has been answered by placing an X in the indicia circle bearing number 5, indicating that the student believes answer "5. Henry Clay" to be correct.

The several fields of one page are alike in their relative arrangement of indicia bearing spots and indicia exposing perforations. But the relative arrangements of indicia bearing and exposing spots in the fields of the different pages are different. Each series of superimposed fields of the successive pages is similar to the other series, and the explanation of the one series shown in Fig. 4 will be sufficient.

Fig. 4 illustrates the top series of superimposed fields of pages 1 to 8. The index points are disposed in two rows, and located in columns 1 to 20, and the spots in the same column of corresponding fields of the plurality of pages are superimposed or one directly above and in line with another. The item spots on the different pages are in different columns so that an item spot on one page will not be superposed upon or alined with or cover up any item spots on the following pages. The perforation spots of one page expose all the item or indicia spots of all the following pages. Thus, on page 1, the indicia spots are in columns 1, 5, 9, 13, and 17 of the top rows and no other of the following pages 2 to 8 has any indicia spots in these columns of the top rows. Page 2 has its indicia spots also in the top row but displaced relative to the indicia spots of page 1 one column to the right, or in columns 2, 6, 10, 14, and 18 (see Fig. 4). Page 1 has perforations in these columns of the top row of index points, so that the indicia spots of page 2 are exposed therethrough. Similarly, each of the following pages 3 to 8 has its indicia spots displaced relative to the indicia spots of the pages above and in line with perforations in the pages above. Accordingly, page 1 has perforations exposing all the indicia spots of pages 2 to 8, page 2 has perforations exposing all the indicia spots of pages 3 to 8, and so on.

Thus, one field of page 1 has five indicia spots and thirty-five perforations through which the thirty-five indicia spots of the corresponding fields of the seven following pages are exposed. In effect, therefore, each field of page 1 is required to expose forty indicia points or the total number of such indicia or answer points in the corresponding fields of the front pages, forty being the number of answer spots accompanying the total of eight questions in one series of superimposed fields, with five choices for each question.

If there were three choices for each of the eight superimposed questions, a total of twenty-four indicia spots on the front pages would be required and page 1 would have three indicia spots and twenty-one perforations. If there were fifteen superimposed question fields, with four choices for each question, the total number of indicia spots required would be sixty, comprised of four indicia points and fifty-six perforations. Thus, the total number of spots required on page 1 is the sum of the indicia spots of all the superimposed fields, which is also the product of the number of superimposed fields and the indicia spots assigned to each field.

If it were desired to use only the front of each leaf of the book or only pages 1 to 8, then theoretically, the number of spots required on the pages would differ in accordance with the number of following sheets. Thus, page 2 would need fewer spots than page 1 since page 2 need expose only the indicia spots of pages 3 to 8. But, in order to employ the book to its maximum capacity, it is desired to use the back pages as well as the front, or in the given example, to use pages 9 to 16. The reverse side or back of each indicia bearing spot of the front pages then serves as the indicia bearing spot of the back pages. Now, if the book is turned over, page 9 becomes the top page, page 10 becomes the second page and so on. Page 9 must have forty index points including thirty-five exposing perforations to expose the indicia bearing spots of the seven following pages. Thus, to utilize the front and back pages, and to provide for front and back reading of the indicia spots, it is necessary to have the first and last page with a like number of index spots. Accordingly, it is preferred to provide each sheet with a similar number of index points or spots.

Fig. 2 shows the upper half of the front mask or master sheet which conceals or masks all the indicia bearing points assigned to wrong answers but has perforations to expose the correct answer indicia spots of all the fields of the front pages 1 to 8 of Figs. 1 and 4. When this mask is placed over the front of the quiz book, only the index spots assigned to the correct answers will appear through the perforations in the mask. Since in the given example, there are eight superimposed question fields, and each field has one correct answer spot, there are eight correct spots in the eight superimposed fields. Accordingly, each field of the mask which is superimposed on a correspondingly located series of superimposed question fields, has eight exposing perforations.

Thus, on page 1, the correct answer spot of the top field is the 1 spot in column 1 of the upper row. This spot will appear through a perforation in column 1 of the upper row of the top field of the mask. The correct spot in the top field of page 2 is the 3 spot which is in column 10 and will appear through the alined exposing perforations of page 1 and of the mask. Similarly, each of the correct answer spots of the remaining pages will be exposed through the alined perforations of the pages above and the perforation in the mask.

By adding the number of X marked spots appearing through the perforations in the mask, the number of correct answers to the questions on pages 1 to 8 will be evaluated.

A similar mask (not shown) which may be referred to as the back or reverse side mask is provided for the back pages 9 to 16 to expose the correct answer spots on the latter pages.

These masks expose the correct answers. It may be desired, however, to determine the number of questions answered incorrectly. For the latter purpose, wrong answer masks are prepared, one for the front and one for the rear pages. The wrong answer masks will mask or conceal all the indicia points assigned to correct answers but will have perforations to expose all the wrong answer spots of the superimposed, similarly facing fields. Thus, each field of the wrong answer mask would have only thirty-two perforations to expose the thirty-two wrong answer spots of the corresponding fields of the pages. By counting up the number of marked spots appearing through perforations of the wrong answer mask, the number of questions incorrectly answered will be determined. (It is understood, of course, that the student is forbidden to mark more than one indicia spot in each question field.)

Fig. 5 shows the application of a wrong answer mask to three superimposed fields. In this case only the front pages are to be utilized and only three choices are given for each question. Thus, each question field of a page has three opaque indicia spots, marked 1, 2, and 3. Page 1 has six perforations to expose the indicia spots of pages 2 and 3, while page 2 has three perforations to expose the three indicia spots of page 3. Page 3 requires no perforations since it is the last page and since the obverse sides of the pages are not to be used.

Since two wrong answer spots occur for each of the three superimposed fields, the wrong answer mask has six perforations to expose all the wrong answer spots of the three fields. In the illustrated example, the wrong spots on page 1 are the 2 and 3 spots; on page 2, the 1 and 3 spots; and on page 3, the 1 and 3 spots. All these spots will appear through correspondingly located perforations in the mask which will at the same time conceal all the correct answer spots.

The quiz books may be marked by manually counting up the marked spots appearing through the masks. Any ordinary manually operated counter may be employed for this purpose, the examiner operating the counter once for each marked spot noted through the mask.

Fig. 3 shows an application of the invention to a census taking book. In this case, each page has parallel horizontal fields of indicia, each field for containing data relating to a different person. Each field has two rows of twenty-four index points each. The perforations of a field are grouped in six zones; namely, the male sex zone, female sex zone, married zone, single zone, employed zone, and unemployed zone. To each zone is allotted eight index points. This is because there are eight leaves in the book, and, consequently, eight similarly facing pages. The obverse and reverse sides of the leaves or the front and back pages may be used as in the previous illustration of the invention.

Each zone of each page has eight index points. One of these points on a page is opaque and an indicia bearing point. The other seven index points are indicia exposing perforations. As in the preceding example of the invention, considering the corresponding superposed zones of the eight pages, each indicia bearing point is located differently than the other indicia bearing points, so that none of these indicia points are alined or superposed. The indicia point of a zone of the top page is in the first column of the top row of the zone, the indicia point of page 2 in column 2 of the top row of the corresponding zone and is exposed through a perforation in page 1, the indicia point of page 3 in the corresponding zone is in column 3 of the top row and is exposed through alined perforations in pages 1 and 2, the indicia point of the page 4 zone is in column 4 and exposed through alined perforations in pages 1, 2, and 3. The indicia point of the page 5 zone is in column 1 of the lower row of the zone and is exposed through alined perforations in pages 1, 2, 3, and 4. The indicia points of pages 6, 7, and 8 are in columns 2, 3, and 4 of the lower row and exposed through perforations in the pages above.

For convenience, each indicia point bears a numeral 1 or 2 to indicate to the census taker which point to mark for designating the fact related to the person pertaining to the field and zone being marked. Thus, if in the top field of page 1, the person is male, the indicia spot in the male zone, bearing number 1, is marked in black with an X by the census taker. If the person is female, then the indicia point in the sex group, bearing number 2, is marked with an X.

The corresponding zones of the several successive fields of each page are vertically alined, so that columns 1 to 4 all pertain to the male zone, columns 5 to 8 to the female zone, and so on. After the eight similarly facing pages have been marked, there will appear through the top page all the X-marked indicia bearing points of the seven pages beneath the top page, while on the latter will also appear its own X-marked points. Thus, by counting up the number of X-marked spots in columns 1 to 4 appearing on and through the top page, the total of male persons designated on all eight pages may be obtained, without opening the book. Similarly, the total of other items may be obtained by scanning the closed book.

While the invention has been disclosed in the several illustrated and described forms, it is understood that variations, departures, and modifications may be devised within the spirit and scope of the invention without departing from the teachings of the invention. It is, therefore, desired to be limited only as indicated by the following claims.

I claim:

1. A stack of superposed sheets, each having, on the obverse and reverse faces, a plurality of separated, fully confined and completely bounded indicia spots, each sheet also having completely confined exposing spots circumscribed on all sides by opaque portions of the sheet, said indicia spots being differently located on the different sheets, and the indicia spots of either the obverse or reverse face of any sheet being alined with exposing spots of each of the overlying sheets to be viewed through the uppermost sheet.

2. A stack of more than two superposed sheets, each with a row of the same number of index spots, the index spots of the rows of the several sheets being in superposed relation, spaced index spots of the row of each sheet being in the form of indicia spots and the remaining index spots being in the form of exposing spots completely bounded on all sides by the area of the sheet, each of the successive sheets having the indicia spots of its row occupying index spots of the row equally offset with respect to the corresponding indicia spots of the row of the underlying sheet, so as to stagger the indicia spots of the several sheets to bring them into alinement with the exposing spots of the successively overlying sheets, whereby all the indicia spots of the underlying sheets are exposed through the exposing spots of the uppermost sheet.

TORKEL EDWIN TORKELSON.